United States Patent
Plihal et al.

(10) Patent No.: US 10,964,013 B2
(45) Date of Patent: Mar. 30, 2021

(54) SYSTEM, METHOD FOR TRAINING AND APPLYING DEFECT CLASSIFIERS IN WAFERS HAVING DEEPLY STACKED LAYERS

(71) Applicant: KLA-Tencor Corporation, Milpitas, CA (US)

(72) Inventors: Martin Plihal, Pleasanton, CA (US); Ankit Jain, Ballston Spa, NY (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 165 days.

(21) Appl. No.: 15/863,753

(22) Filed: Jan. 5, 2018

(65) Prior Publication Data

US 2018/0204315 A1    Jul. 19, 2018

Related U.S. Application Data

(60) Provisional application No. 62/444,690, filed on Jan. 10, 2017.

(51) Int. Cl.
| | |
|---|---|
| *G06K 9/00* | (2006.01) |
| *G06T 7/00* | (2017.01) |
| *G06K 9/20* | (2006.01) |
| *G06K 9/62* | (2006.01) |
| *G06T 7/70* | (2017.01) |

(52) U.S. Cl.
CPC ............ *G06T 7/001* (2013.01); *G06K 9/20* (2013.01); *G06K 9/627* (2013.01); *G06K 9/6256* (2013.01); *G06K 9/6267* (2013.01); *G06T 7/0004* (2013.01); *G06T 7/70* (2017.01); *G06T 2200/04* (2013.01); *G06T 2207/10016* (2013.01); *G06T 2207/10148* (2013.01); *G06T 2207/20081* (2013.01); *G06T 2207/30148* (2013.01)

(58) Field of Classification Search
CPC . G06T 7/001; G06T 7/70; G06T 2207/30148; G06T 2207/10148; G06T 2200/04; G06T 2207/20081; G06T 2207/10016; G06T 7/0004; G06K 9/6267; G06K 9/6256; G06K 9/627; G06K 9/20
See application file for complete search history.

(56) References Cited

U.S. PATENT DOCUMENTS

| | | | |
|---|---|---|---|
| 6,456,899 B1 | 9/2002 | Gleason et al. | |
| 6,696,679 B1 | 2/2004 | Graef et al. | |
| 6,999,614 B1 * | 2/2006 | Bakker | G06T 7/0004 382/145 |

(Continued)

OTHER PUBLICATIONS

International Search Report from International Application No. PCT/US2018/013178, dated Apr. 27, 2018.

*Primary Examiner* — Samir A Ahmed
(74) *Attorney, Agent, or Firm* — Zilka-Kotab, P.C.

(57) ABSTRACT

A system, method, and non-transitory computer readable medium are provided for training and applying defect classifiers in wafers having deeply stacked layers. In use, a plurality of images generated by an inspection system for a location of a defect detected on a wafer by the inspection system are acquired. The location on the wafer is comprised of a plurality of stacked layers, and each image of the plurality of images is generated by the inspection system at the location using a different focus setting. Further, a classification of the defect is determined, utilizing the plurality of images.

16 Claims, 5 Drawing Sheets

(56) References Cited

U.S. PATENT DOCUMENTS

| | | | |
|---|---|---|---|
| 7,659,975 | B1 | 2/2010 | Ramani et al. |
| 7,676,077 | B2* | 3/2010 | Kulkarni ............. G06F 17/5045 |
| | | | 382/144 |
| 8,126,255 | B2 | 2/2012 | Bhaskar et al. |
| 9,293,298 | B2 | 3/2016 | Lauber |
| 2006/0269120 | A1 | 11/2006 | Nehmadi et al. |
| 2007/0156379 | A1* | 7/2007 | Kulkarni ............. G06F 17/5045 |
| | | | 703/14 |
| 2012/0044486 | A1* | 2/2012 | Chen ....................... H01L 22/12 |
| | | | 356/237.5 |
| 2012/0116733 | A1* | 5/2012 | Thattaisundaram ........................ |
| | | | G05B 19/41875 |
| | | | 703/2 |
| 2014/0139830 | A1* | 5/2014 | Lange ................ G01N 21/9501 |
| | | | 356/237.5 |
| 2014/0300890 | A1 | 10/2014 | Lange et al. |
| 2015/0179400 | A1* | 6/2015 | Lauber .................... H01L 22/12 |
| | | | 250/307 |
| 2015/0254832 | A1* | 9/2015 | Plihal ....................... G06T 7/001 |
| | | | 382/149 |
| 2015/0262038 | A1* | 9/2015 | Konuru ................. G06T 7/0004 |
| | | | 382/149 |

* cited by examiner

SYSTEM, METHOD FOR TRAINING AND APPLYING DEFECT CLASSIFIERS IN WAFERS HAVING DEEPLY STACKED LAYERS

RELATED APPLICATION(S)

This application claims the benefit of U.S. Provisional Patent Application No. 62/444,690, filed Jan. 10, 2017, the entire contents of which are incorporated herein by reference.

FIELD OF THE INVENTION

The present invention relates to detection of defects on a wafer, and more particularly to classifying defects detected from wafer.

BACKGROUND

Inspection system processes are used at various steps during a semiconductor manufacturing process to detect defects on wafers. Further, as the dimensions of semiconductor devices decrease, inspection becomes even more important to the successful manufacture of acceptable semiconductor devices because smaller defects can cause the devices to fail.

Typically, an inspection system (i.e. tool) captures images of a wafer, and defects are detected from those images. The images may also be referred to as signals generating from inspecting the wafer. However, information beyond simple defect detection is also often generated during inspection system processes, including specifically the classification of such defects. For example, each of the detected defects may be classified as a defect of interest (DOI) or a nuisance (i.e. not an actual defect or a defect that a user does not care about and thus is not a DOI). Each of the detected defects, or the DOIs, are further often classified into different groups (i.e. defect types). In one such example, after finding defects, the defects may be classified into different groups based on characteristics of the defects such as size, magnitude, and/or location. The defect classifications can then be fed back to the inspection system, for the purpose of tuning the inspection system. The tuning may be performed in order to make the defect detectable with the inspection system. For example, tuning the inspection system may include altering one or more optical parameters of the inspection system and/or one or more defect detection (output processing) parameters of the inspection system.

Defect classification many times cannot be performed based on just images or information generated by the inspection system. In these instances, additional information may be generated using an additional review system, and defect classification is then determined based on the additional information. In some such instances, defects found by an inspection system may be reviewed using a high resolution scanning electron microscope (SEM) review tool. Traditionally, a relatively large numbers of SEM images (e.g. signals) is collected, and further each of these images may be displayed on a computer screen for a user to determine if there is a visible defect present in the image. If a defect is detected by eye, the defect can then be classified by the user into one of several categories depending on its shape, size, location or other attributes.

Some review systems have been developed to automate the classification of defects, for example as disclosed in U.S. Pat. No. 9,293,298 to Jan A. Lauber entitled "Defect discovery and inspection sensitivity optimization using automated classification of corresponding electron beam images." While these automated review systems have improved prior systems requiring manual classification subject to human error, these automated review systems still exhibit limitations. In particular, defect review systems, such as those described above, have been unable to classify defects in wafer having stacked layers, such as a three-dimensional (3D) NAND wafer, when those defects are below the top layer of the wafer. This is because existing defect review systems cannot obtain images of the underlying layers of the wafer. Instead, to obtain the required images of any underlying layer, the above layers would need to be physically removed, thus destroying the wafer.

There is thus a need for addressing these and/or other issues associated with the prior art.

SUMMARY

A system, method, and non-transitory computer readable medium are provided for training and applying defect classifiers in wafers having deeply stacked layers. In use, a plurality of images generated by an inspection system for a location of a defect detected on a wafer by the inspection system are acquired. The location on the wafer is comprised of a plurality of stacked layers, and each image of the plurality of images is generated by the inspection system at the location using a different focus setting. Further, a classification of the defect is determined, utilizing the plurality of images.

DETAILED DESCRIPTION

The following description discloses a system, method, and non-transitory computer readable medium for classifying defects in wafers having stacked layers. It should be noted that this system, method, and non-transitory computer readable medium, including the various embodiments described below, may be implemented in the context of any integrated and/or separate computer and inspection system (e.g. wafer inspection, reticle inspection, laser scanning inspection systems, etc.), such as the ones described below with reference to FIGS. 1A-B.

Figure 1A:
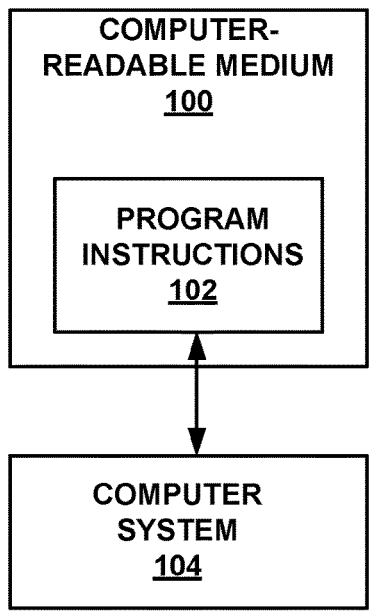
FIG. 1A shows a block diagram illustrating one embodiment of a non-transitory computer-readable medium that includes program instructions executable on a computer system for performing one or more of the computer-implemented methods described herein.

An additional embodiment relates to a non-transitory computer-readable medium storing program instructions executable on a computer system for performing a computer-implemented method for classifying defects in wafers having stacked layers. One such embodiment is shown in FIG. 1A. In particular, as shown in FIG. 1A, computer-readable medium 100 includes program instructions 102 executable on computer system 104. The computer-implemented method includes the steps of the method described below with reference to FIG. 2. The computer-implemented method for which the program instructions are executable may include any other operations described herein.

Program instructions 102 implementing methods such as those described herein may be stored on computer-readable medium 100. The computer-readable medium may be a storage medium such as a magnetic or optical disk, or a magnetic tape or any other suitable non-transitory computer-readable medium known in the art. As an option, computer-readable medium 100 may be located within computer system 104.

The program instructions may be implemented in any of various ways, including procedure-based techniques, component-based techniques, and/or object-oriented, techniques, among others. For example, the program instructions may be implemented using ActiveX controls, C++ objects, JavaBeans, Microsoft Foundation Classes ("MFC"), or other technologies or methodologies, as desired.

The computer system 104 may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system 104 may also include any suitable processor known in the art such as a parallel processor. In addition, the computer system 104 may include a computer platform with high speed processing and software, either as a standalone or a networked tool.

Figure 1B:
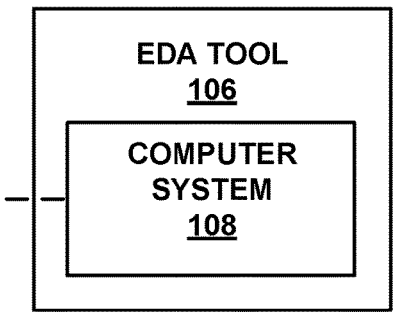
FIG. 1B is a schematic diagram illustrating a side view of one embodiment of an inspection system configured to detect defects on a fabricated device.
Figure 1B:
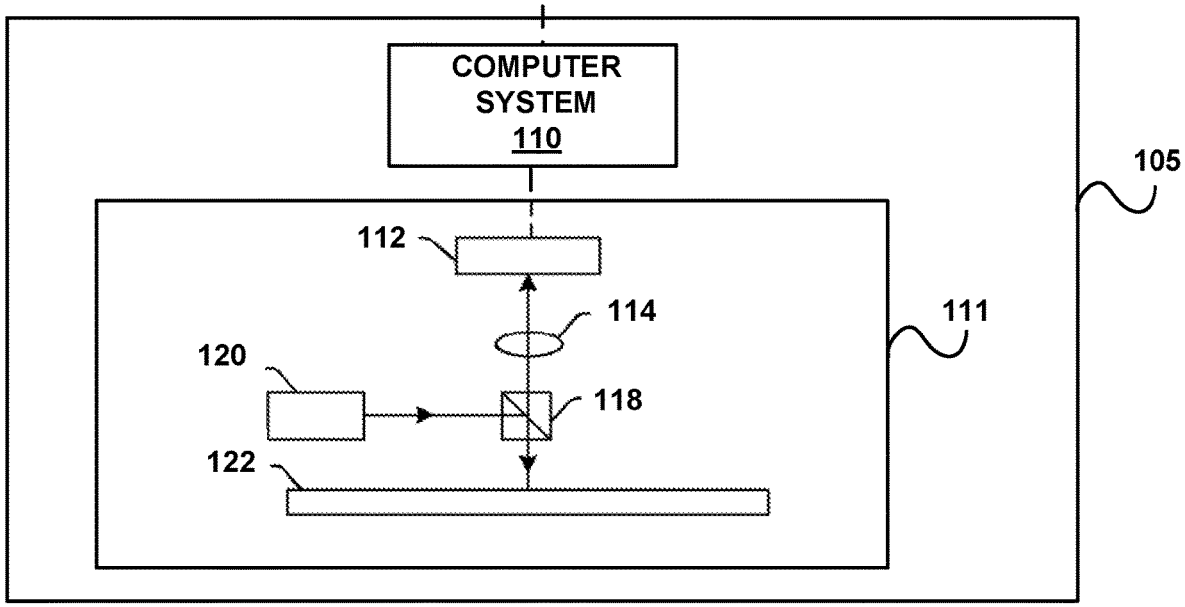

An additional embodiment relates to a system configured for classifying defects in wafers having stacked layers. One embodiment of such a system is shown in FIG. 1B. The system includes inspection system 105 configured to generate output for a component fabricated on a wafer (or other device), which is configured in this embodiment as described further herein. The system also includes one or more computer systems configured for performing the operations described below with reference to FIG. 2. The one or more computer systems may be configured to perform these operations according to any of the embodiments described herein. The computer system(s) and the system may be configured to perform any other operations described herein and may be further configured as described herein.

In the embodiment shown in FIG. 1B, one of the computer systems is part of an electronic design automation (EDA) tool, and the inspection system and another of the computer systems are not part of the EDA tool. These computer systems may include, for example, the computer system 104 described above with reference to FIG. 1A. For example, as shown in FIG. 1B, one of the computer systems may be computer system 108 included in EDA tool 106. The EDA tool 106 and the computer system 108 included in such a tool may include any commercially available EDA tool.

The inspection system 105 may be configured to generate the output for the component on a wafer by scanning the wafer with light and detecting light from the wafer during the scanning. For example, as shown in FIG. 1B, the inspection system 105 includes light source 120, which may include any suitable light source known in the art. Light from the light source may be directed to beam splitter 118, which may be configured to direct the light from the light source to wafer 122. The light source 120 may be coupled to any other suitable elements (not shown) such as one or more condensing lenses, collimating lenses, relay lenses, objective lenses, apertures, spectral filters, polarizing components and the like. As shown in FIG. 1B, the light may be directed to the wafer 122 at a normal angle of incidence. However, the light may be directed to the wafer 122 at any suitable angle of incidence including near normal and oblique incidence. In addition, the light or multiple light beams may be directed to the wafer 122 at more than one angle of incidence sequentially or simultaneously. The inspection system 105 may be configured to scan the light over the wafer 122 in any suitable manner.

Light from wafer 122 may be collected and detected by one or more channels of the inspection system 105 during scanning. For example, light reflected from wafer 122 at angles relatively close to normal (i.e., specular reflected light when the incidence is normal) may pass through beam splitter 118 to lens 114. Lens 114 may include a refractive optical element as shown in FIG. 1B. In addition, lens 114 may include one or more refractive optical elements and/or one or more reflective optical elements. Light collected by lens 114 may be focused to detector 112. Detector 112 may include any suitable detector known in the art such as a charge coupled device (CCD) or another type of imaging detector. Detector 112 is configured to generate output that is responsive to the reflected light collected by lens 114. Therefore, lens 114 and detector 112 form one channel of the inspection system 105. This channel of the inspection system 105 may include any other suitable optical components (not shown) known in the art.

Since the inspection system shown in FIG. 1B is configured to detect light specular reflected from the wafer 122, the inspection system 105 is configured as a (bright field) BF inspection system. Such an inspection system 105 may, however, also be configured for other types of wafer inspection. For example, the inspection system shown in FIG. 1B may also include one or more other channels (not shown). The other channel(s) may include any of the optical components described herein such as a lens and a detector, configured as a scattered light channel. The lens and the detector may be further configured as described herein. In this manner, the inspection system 105 may also be configured for (dark field) DF inspection.

The inspection system 105 may also include a computer system 110 that is configured to perform one or more steps of the methods described herein. For example, the optical elements described above may form optical subsystem 111 of inspection subsystem 105, which may also include computer system 110 that is coupled to the optical subsystem 111. In this manner, output generated by the detector(s) during scanning may be provided to computer system 110. For example, the computer system 110 may be coupled to detector 112 (e.g., by one or more transmission media shown by the dashed line in FIG. 1B, which may include any suitable transmission media known in the art) such that the computer system 110 may receive the output generated by the detector.

The computer system 110 of the inspection system 105 may be configured to perform any operations described herein. For example, computer system 110 may be configured for systematic and stochastic characterization of pattern defects identified from a fabricated component, as described herein. In addition, computer system 110 may be configured to perform any other steps described herein. Furthermore, although some of the operations described herein may be performed by different computer systems, all of the operations of the method may be performed by a single computer system such as that of the inspection system 105 or a stand-alone computer system. In addition, the one or more of the computer system(s) may be configured as a virtual inspector such as that described in U.S. Pat. No. 8,126,255 issued on Feb. 28, 2012 to Bhaskar et al., which is incorporated by reference as if fully set forth herein.

The computer system 110 of the inspection system 105 may also be coupled to another computer system that is not part of the inspection system such as computer system 108, which may be included in another tool such as the EDA tool 106 described above such that computer system 110 can receive output generated by computer system 108, which may include a design generated by that computer system 108. For example, the two computer systems may be effectively coupled by a shared computer-readable storage medium such as a fab database or may be coupled by a transmission medium such as that described above such that information may be transmitted between the two computer systems.

It is noted that FIG. 1B is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

In a further embodiment, the inspection system 105 may be directly or indirectly coupled to a review system (not shown), such as the SEM review system disclosed in U.S. Pat. No. 9,293,298. The SEM review system may be operable to review defects detected by the inspection system 105 for classification of the defects, which in turn can be used to train the inspection system 105 for better defect detection. It should be noted that the embodiments described below may be implemented in the context of the review system described above.

Figure 2:
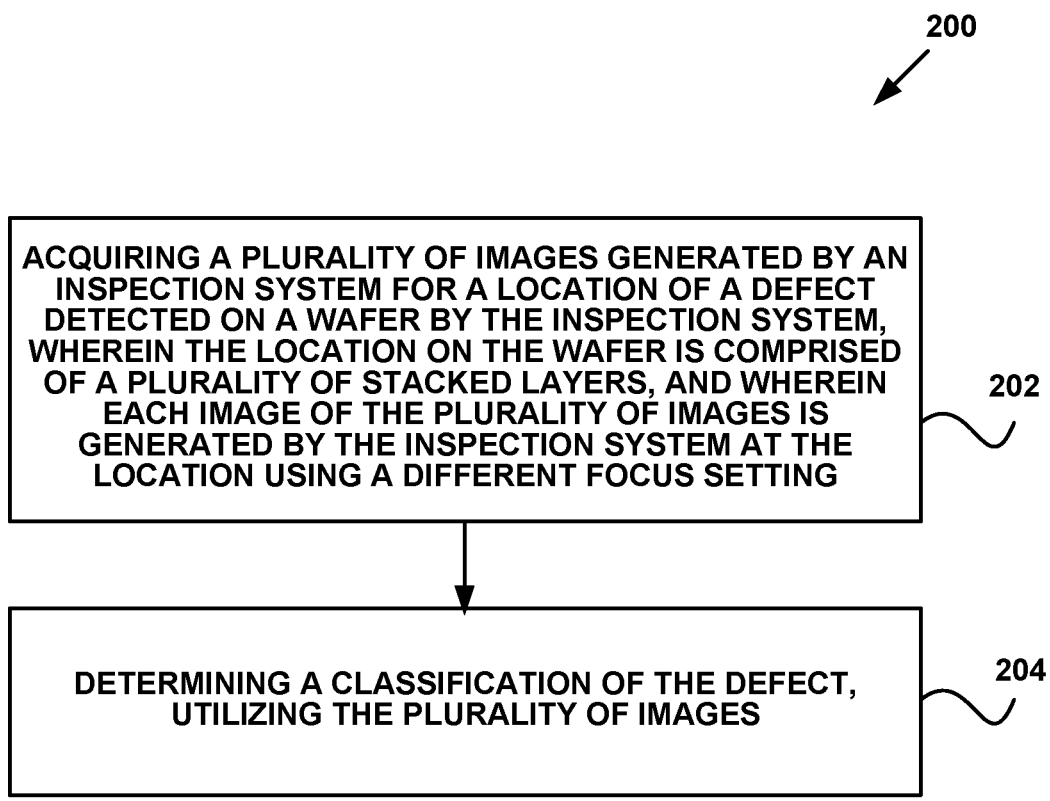
FIG. 2 shows a method for classifying a defect in a wafer having stacked layers, in accordance with one embodiment.

FIG. 2 shows a method 200 for classifying a defect in a wafer having stacked layers, in accordance with one embodiment. The method 200 may be performed by any computer system in communication with an inspection system and review system, such as those described above. Further, the method 200 may be performed by a computer system that includes the inspection system and/or review system. Further, while only one defect is described herein, it should be noted that the method 200 may similarly be applied to any number of different defects in the wafer.

As shown in operation 202, a plurality of images are acquired, where the images are generated by an inspection system for a location of a defect detected on a wafer by the inspection system. In the context of the present embodiment, the location on the wafer is comprised of a plurality of deeply stacked layers. For example, the wafer may be fabricated through a layering process where multiple layers are vertically stacked at least at the location where the defect is detected by the inspection system. In one exemplary embodiment, the wafer may be a three-dimensional (3D) NAND wafer.

While operation 202 is described with reference to a location in which a defect is detected by the inspection system, it should be noted that the location may or may not have an actual defect. For example, the detected defect may actually be a nuisance or other non-defect. In other embodiments, the defect may be an actual defect, and may be located anywhere within the stacked layers at the location identified by the inspection system. For example, the defect may be located on a top layer of the stacked layers, or in an underlying layer of the stacked layers. In any case, the inspection system acquires images at the location on the wafer in which the defect is detected by the inspection system, for classification of the defect as described in more detail below.

In the context of the present embodiment, each image (e.g. signal) of the plurality of images is generated by the inspection system at the location using a different focus setting. In other words, the inspection system may use a first focus setting to generate a first image of the location on the wafer, a second focus setting to generate a second image of the location on the wafer, a third focus setting to generate a third image of the location on the wafer, and so on. Each of the different focus settings may focus light, at a different depth, into the wafer at the location. In this way, the images obtained by the inspection system may differ. The number of images acquired, and the specific focus settings used, may be preconfigured.

Further, as shown in operation 204, a classification of the defect is determined, utilizing the plurality of images. The classification performed in this operation 204 may refer to labeling defects in a training set. This may be accomplished directly from the images acquired in operation 202 or from through-focus (TF) signal profiles determined based on the images acquired in operation 202. In one embodiment, the classification may indicate whether the defect is an actual defect (e.g. defect of interest (DOI)) or a non-defect (e.g. nuisance). In another embodiment, the classification of the defect may indicate in which of the stacked layers the defect exists (e.g. a top layer or an underlying layer).

As noted above, the classification of the defect may be determined from TF signal profiles. These profiles may be determined by identifying, for one or more attributes, a change across the plurality of images acquired for the location at which the defect was detected by the inspection system. Thus, the classification of the defect may be determined based on the change identified for the one or more attributes. These attributes may include brightness, magnitude, and/or any other attributes distinguishable across the acquired images. In this embodiment, the classification may be determined by processing the identified change information described above using a design for the wafer, predefined attributes of actual defects, or a combination thereof.

To this end, the defect detected by the inspection system may be classified using the images acquired from the inspection system or the TF signal profiles generated therefrom, where the images are generated using different focus settings. This through-focus inspection method described above may provide information about the depth of the defect, which is missing in existing single-focus-offset inspection methods used by existing inspection systems. This may allow for classification of a defect detected from a wafer having stacked layers. To the contrary, in prior art systems, any defect existing within stacked layers (i.e. below the top layer) on the wafer is not sufficiently visible via the inspection system. This is because prior art inspections systems are not configured to use different focus settings to acquire images at the location of the defect.

As a further option, the inspection system may be tuned using the training set mentioned above. This may include using the training set to train a classifier of the inspection system, thereby tuning the performance of the classifier which operates on defect attributes when it classifies all defects during inspection. Accordingly, the classifier may be considered to be a machine learning classifier. The classification produced by the machine learning classifier may be to separate the defect population into different classes (bins), and thus may also be referred to as binning, or in some cases also nuisance filtering, which may be the final inspection result.

The TF signature may indicate the location of the defect, the classification of the defect, attributes of the defect, etc. In yet a further embodiment, the inspection system may be tuned using the TF signature generated for the defect.

The defects in a same bin may be plotted on the wafer map to generate a spatial signature for the bin. The inspection system may then be further tuned using the spatial signature generated for the bin.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

For example, according to the below described embodiments, inspections of wafers having stacked layers may be provided by combining TF, optical patch, and spatial defect distribution. These embodiments may provide an efficient method for obtaining, modifying, and reducing the training set used to train the classifier, may enable splitting or merging of bins by considering similarities and dissimilarities of TF signals and spatial defect distributions, and may provide quick verification methods for evaluating classification purity using spatial signature of relevant bins and TF signal profiles of defects in those bins.

Figure 3:
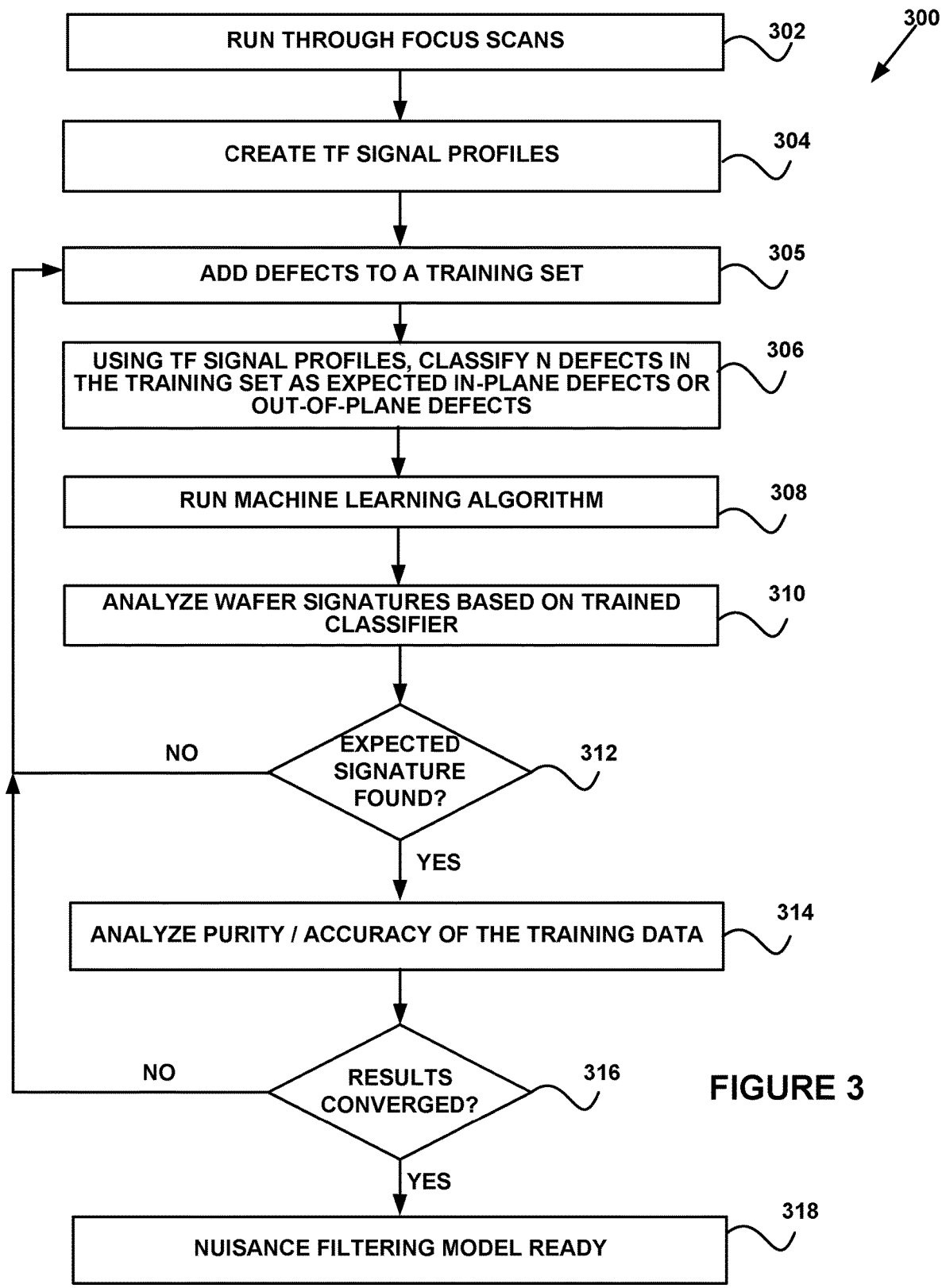
FIG. 3 illustrates a method for classifier training, in accordance with one embodiment.

FIG. 3 illustrates a method 300 for classifier training, in accordance with one embodiment. As an option, the method 300 may be carried out in the context of any one or more of the embodiments set forth in any previous and/or subsequent figure(s) and/or description thereof. However, it is to be appreciated that the method 300 may be carried out in the context of any desired environment.

As shown in operation 302, through focus scans are run. The through focus (TF) scans may be run by an inspection system. For example, the TF scans may generate images of a location of the defect on a wafer. In the present embodiment, the location on the wafer includes a plurality of stacked layers, and each scan obtains an image at the location using a different focus setting.

Additionally, as shown in operation 304, TF signal profiles are created using images generated during the through focus scans. These TF signal profiles may each be a 1-dimensional (1D) histogram, having the focus setting on the x-axis and signal (image) attributes on the y-axis. The attributes may be brightness, magnitude, etc. Defects are then added to a training set, as shown in operation 305. Thus, the training set may be a sample of the defects.

Further, as shown in operation 306, N defects in the training set are classified as either expected in-plane defects or out-of-plane defects, using the TF signal profiles. N may be a predefined number to sample of all defects detected by the inspection system, in one embodiment. Further, the in-plane defects may be those identified from the TF signal profiles as existing across a single plane (layer) of wafer, and out-of-plane defects may be those identified from the TF signal profiles as existing across a plurality of planes (layers) of the wafer.

As shown in operation 308, a machine learning algorithm is run. Any one of many different machine learning algorithms that work with pre-calculated features can be used, for example. In any case, the machine learning algorithm is run on the classified N defects to generate a trained classifier.

Still yet, in operation 310, wafer signatures are analyzed based on the trained classifier. It is then determined in decision 312 whether an expected signature is found, based on the analysis of operation 310. If an expected signature is not found, the method 300 returns to operation 305. If, however, an expected signature is found, purity and accuracy of the training data is analyzed, as shown in operation 314. It is then determined in decision 316 whether the results are converged.

If it is determined that the results are not converged, the method 300 returns to operation 305. If, however, it is determined that the results are converged, then as shown in operation 318 the nuisance filtering model is determined to be ready (e.g. for use by the inspection system).

Figure 4:
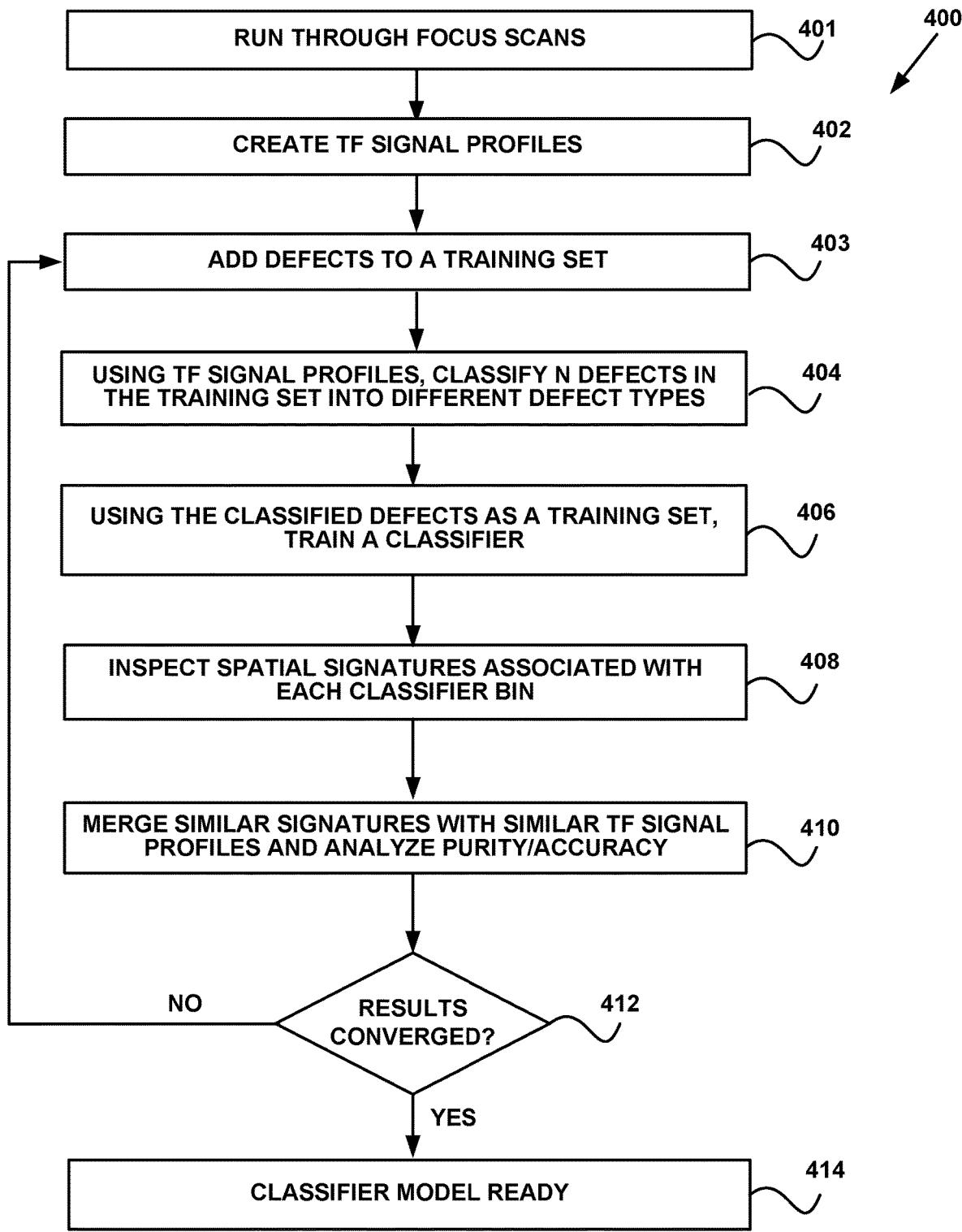
FIG. 4 illustrates an unsupervised binning method, in accordance with one embodiment.

FIG. 4 illustrates an unsupervised binning method 400, in accordance with one embodiment. The unsupervised method 400 is used to discover the typical defect signatures and spatial signatures and to uncover the relation there between such that the relationship along with the quality measures for the classifier will help identify the DOI bins. As an option, the method 400 may be carried out in the context of any one or more of the embodiments set forth in any previous and/or subsequent figure(s) and/or description thereof. However, it is to be appreciated that the method 400 may be carried out in the context of any desired environment.

As shown in operation 401, TF scans are run. Then, in operation 402, TF signal profiles are created. Further, as shown in operation 403, defects are added to a training set. For example, defects detected by the inspection system and having diverse TF signal profiles and images are selected. Then, in operation 404, N defects in the training set are classified into different defect types, using the TF signal profiles.

Additionally, as shown in operation 406, a classifier is trained, using the classified defects as a training set. The classifier may operate on all defect features (e.g. optical, design, etc.), or the attribute selection may exclude design attributes or other attributes as desired. Furthermore, as shown in operation 408, a training process is applied to spatial signatures associated with each classifier bin. In particular, this may refer to the training of the classifier, in which the spatial signature formed on the wafer by defects from one of the classifier bins are inspected (i.e. by a human expert or the machine learning algorithm) to identify bins with similar spatial signatures. Then, in operation 410, similar spatial signatures are merged by merging the bins while purity/accuracy of TF signal profiles in the merged bins are analyzed.

It is then determined in decision 412 whether the results are converged. If it is determined that the results are not converged, the method 400 returns to operation 403. Repeating operation 403 may allow for the training set to be enhanced. If, however, it is determined that the results are converged, then as shown in operation 414 the classifier model is determined to be ready (e.g. for use by the inspection system). As an option, a confusion matrix, classification confidence, bin purity in terms of signal profiles, and spatial signature at convergence may be used to quantify the quality of the classifier.

Figure 5:
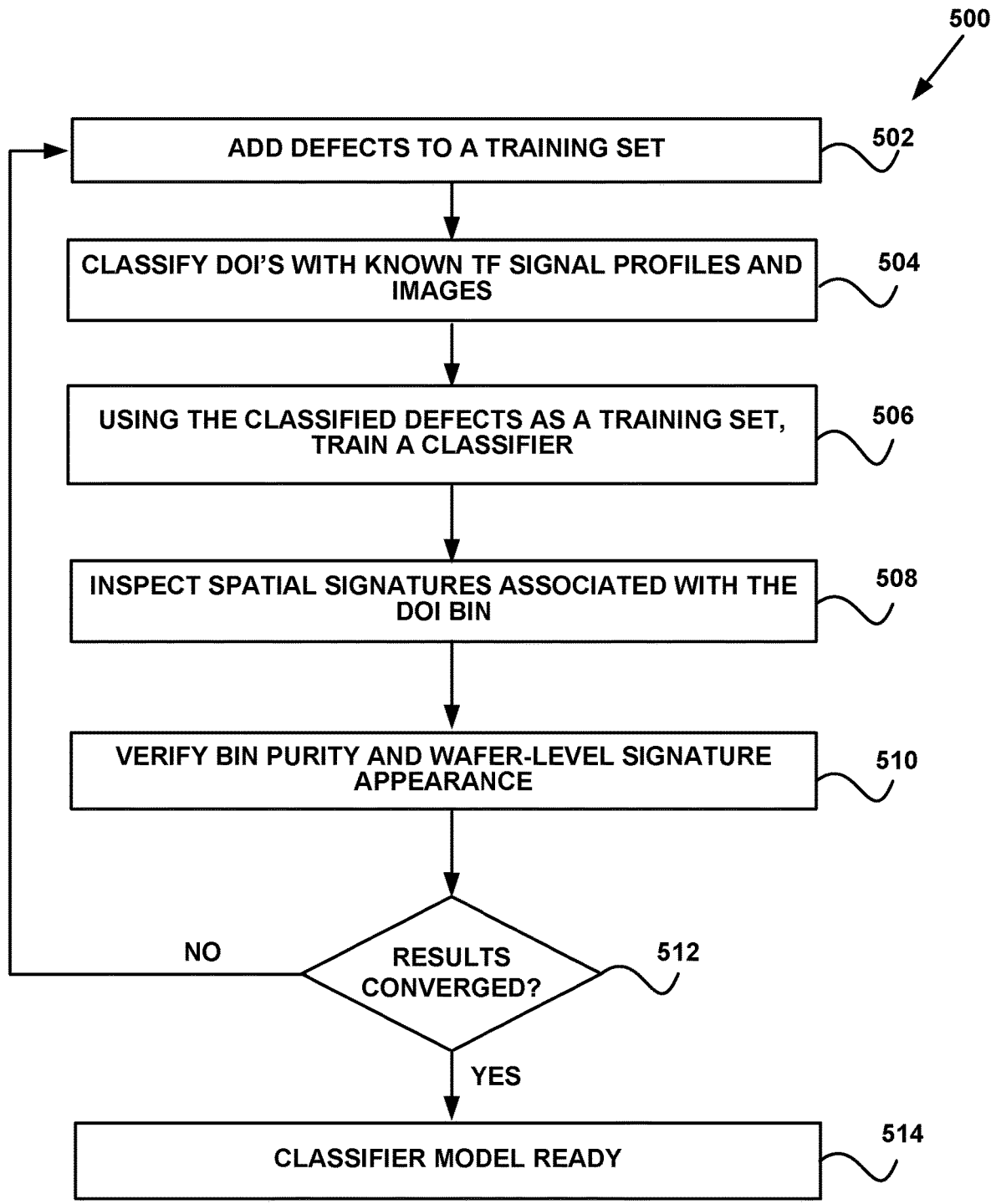
FIG. 5 illustrates a supervised binning method, in accordance with one embodiment.

FIG. 5 illustrates a supervised binning method 500, in accordance with one embodiment. The supervised method 500 is used when both the TF signatures and the DOI spatial signatures are known. As an option, the method 500 may be carried out in the context of any one or more of the embodiments set forth in any previous and/or subsequent figure(s) and/or description thereof. However, it is to be appreciated that the method 500 may be carried out in the context of any desired environment.

As shown in operation 502, defects are added to a training set. For example, defects detected by the inspection system and having diverse TF signal profiles and images are selected for the training set. Then, in operation 504, DOI's with known TF signal profiles and images are classified. This operation 504 separates these DOI's from the rest of the defects.

Additionally, in operation 506, a classifier is trained using the classified defects as a training set. The classifier may operate on all defect features (e.g. optical, design, etc.) or a selected subset thereof. Furthermore, as shown in operation 508, spatial signatures associated with the DOI bin are inspected. Then, in operation 510, bin purity and wafer-level signature appearance are verified.

It is then determined in decision 512 whether the results are converged. If it is determined that the results are not converged, the method 500 returns to operation 502. Repeating operation 502 may allow for the training set to be enhanced. If, however, it is determined that the results are converged, then as shown in operation 514 the classifier model is determined to be ready (e.g. for use by the inspection system). As an option, a confusion matrix, classification confidence, bin purity in terms of signal profiles, and spatial signature matching score at convergence may be used to quantify the quality of the classifier.

The embodiments described above with reference to the FIGS. 3-5 disclose a method for training defect classifiers and nuisance filters, including when the types of training defects can only be determined with a low degree of confidence and/or in indirect way, but when the ground truth can be obtained with higher degree of confidence by combining several distinct uncorrelated DOI characteristics. An example of the multitude of characteristics is the TF signal and wafer level (spatial) defect distribution associated with defects having such TF signal profile. Specifically, the method applies to wafers comprised of stacked layers, such as 3D NAND optical inspections, where buried defects deep in the layer stack are not visible on SEM review tools, which are typically used to establish the defect types in the training set.

Since TF inspections contain tens of attributes and features per focus setting, if there are 10 focus settings used to collect images during the inspection, then there are Hundreds of attributes to create a nuisance filter or a binner. In such a case, the user will find it tedious to manually create a classifier. However, the embodiments described above with reference to the FIGS. 3-5 uniquely enable a machine learnt classifier based on the focus plane that the DOI is expected to come from.

The machine trained classifier may be provided using a training set having defects classified using TF images (i.e. images at different focus settings) or TF signal profiles. This defect classification for the training set may be done in one of two ways:

(1) If the TF signal profile of the DOI is known, then the defect is classified based on the TF signal profile. See the supervised approach of FIG. 5 for additional relevant description.

(2) The defect is classified using the TF images directly. See the unsupervised approach of FIG. 4 for additional relevant description.

For both (1) and (2) above, the classification may be performed:

(A) manually (i.e. an expert decides the classification), or (B) automatically by simulating how the TF images or TF signal profiles should look for each defect type and for nuisance, and then assigning the defects in the training set to the type whose simulated value "resembles" the training defect the most.

The machine trained classifier may further be provided by training a classifier on the basis of the approximate "ground truth" (i.e. identified defect types) using all optical and other relevant defect features on the training wafer. Thus, while there is disclosure above of both supervised and unsupervised operations based on the level of knowledge of the ground truth, there may also be a range of possibilities between supervised and unsupervised during the classifier training, including:

(A) The TF signal profiles AND the spatial signatures may be known for one or more defect types, then use the fully supervised operation;

(B) Only TF signal profile of one or more defect types may be known, and spatial signature is unknown;

(C) Only spatial signature for one or more defect types may be known, but the TF signal profiles are not;

(D) None of the above information is known well, so use the fully unsupervised operation.

Moreover, simultaneous tuning of the signal profile purity in the classifier bins, and the quality of the wafer-level signature of the relevant bins with respect to the known characteristics may be provided. Iterative buildup of the training set until convergence may be provided, and evaluation of the binning relevance of the binning may be additionally provided using a confusion matrix, confidence of the classification, purity of the relevant DOI bins, and accuracy of the spatial signatures formed by the DOI bin(s).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program product having code executable by a processor to perform a method comprising:

acquiring a plurality of images generated by an inspection system for a location of a defect detected on a wafer by the inspection system, wherein the location on the wafer is comprised of a plurality of stacked layers, and wherein each image of the plurality of images is generated by the inspection system at the location using a different focus setting;

adding the defect to a training set;

determining a classification of the defect, utilizing the plurality of images, wherein the classification of the defect is determined using a through-focus signal profile generated for the defect utilizing the plurality of images, the through-focus signal profile being a 1-dimensional (1D) histogram having the focus setting on a first axis and attributes of a corresponding image on a second axis;

labeling the defect in the training set based on the classification determined for the defect; and training a machine learning classifier of the inspection system, using the training set, to tune performance of the machine learning classifier during classification of defects for subsequent inspections of wafers having stacked layers.

2. The non-transitory computer readable medium of claim 1, wherein the wafer is a three-dimensional (3D) NAND wafer.

3. The non-transitory computer readable medium of claim 1, wherein the defect is located in an underlying layer of the plurality of stacked layers.

4. The non-transitory computer readable medium of claim 1, wherein each of the different focus settings focuses light, at a different depth, into the wafer at the location.

5. The non-transitory computer readable medium of claim 1, wherein the classification of the defect is determined directly from the plurality of images.

6. The non-transitory computer readable medium of claim 1, wherein the attributes include brightness.

7. The non-transitory computer readable medium of claim 1, wherein the attributes include magnitude.

8. The non-transitory computer readable medium of claim 1, wherein the classification of the defect indicates a layer of the plurality of stacked layers at which the defect exists.

9. The non-transitory computer readable medium of claim 1, further comprising binning the defects using the trained classifier.

10. The non-transitory computer readable medium of claim 9, further comprising determining a portion of the defects that are included in a same bin and plotting the portion of the defects to generate a spatial signature for the bin.

11. The non-transitory computer readable medium of claim 10, further comprising tuning the inspection system using the spatial signature generated for the bin.

12. A method, comprising:

acquiring, by a computer processor, a plurality of images generated by an inspection system for a location of a defect detected on a wafer by the inspection system, wherein the location on the wafer is comprised of a plurality of stacked layers, and wherein each image of the plurality of images is generated by the inspection system at the location using a different focus setting;

adding, by the computer processor, the defect to a training set;

determining, by the computer processor, a classification of the defect, utilizing the plurality of images, wherein the classification of the defect is determined using a through-focus signal profile generated for the defect utilizing the plurality of images, the through-focus signal profile being a 1-dimensional (1D) histogram having the focus setting on a first axis and attributes of a corresponding image on a second axis;

labeling, by the computer processor, the defect in the training set based on the classification determined for the defect; and training, by the computer processor, a machine learning classifier of the inspection system, using the training set, to tune performance of the machine learning classifier during classification of defects for subsequent inspections of wafers having stacked layers.

13. A system, comprising:

memory storing computer code; and a processor coupled to the memory and configured to execute the computer code to perform a method comprising:

acquiring a plurality of images generated by an inspection system for a location of a defect detected on a wafer by the inspection system, wherein the location on the wafer is comprised of a plurality of stacked layers, and wherein each image of the plurality of images is generated by the inspection system at the location using a different focus setting;

adding the defect to a training set;

determining a classification of the defect, utilizing the plurality of images wherein the classification of the defect is determined using a through-focus signal profile generated for the defect utilizing the plurality of images, the through-focus signal profile being a 1-dimensional (1D) histogram having the focus setting on a first axis and attributes of a corresponding image on a second axis;

labeling the defect in the training set based on the classification determined for the defect; and training a machine learning classifier of the inspection system, using the training set, to tune performance of the machine learning classifier during classification of defects for subsequent inspections of wafers having stacked layers.

14. The system of claim 13, wherein the system comprises the inspection system.

15. The non-transitory computer readable medium of claim 1, wherein the machine learning classifier is trained using machine learning that is run on the training set.

16. The non-transitory computer readable medium of claim 1, wherein the training set includes defects detected by the inspection system and having diverse through-focus signal profiles and images.

* * * * *